United States Patent
Yu et al.

(10) Patent No.: US 11,835,040 B2
(45) Date of Patent: Dec. 5, 2023

(54) METHOD AND DEVICE FOR CONTROLLING CAPACITY CHANGE OF COMPRESSOR, AND SMART HOME APPLIANCE

(71) Applicant: GREE ELECTRIC APPLIANCES, INC. OF ZHUHAI, Zhuhai (CN)

(72) Inventors: Kai Yu, Zhuhai (CN); Longfei Li, Zhuhai (CN); Qunbo Liu, Zhuhai (CN); Yi Ni, Zhuhai (CN); Ke Xu, Zhuhai (CN); Yaopeng Rong, Zhuhai (CN); Zhongqiu Zhang, Zhuhai (CN); Zhenjiang Zhao, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 297 days.

(21) Appl. No.: 16/972,001

(22) PCT Filed: Dec. 22, 2018

(86) PCT No.: PCT/CN2018/122913
§ 371 (c)(1),
(2) Date: Dec. 4, 2020

(87) PCT Pub. No.: WO2020/000938
PCT Pub. Date: Jan. 2, 2020

(65) Prior Publication Data
US 2021/0108845 A1    Apr. 15, 2021

(30) Foreign Application Priority Data
Jun. 27, 2018   (CN) .......................... 201810674845.7

(51) Int. Cl.
*F04B 49/20* (2006.01)
*F04B 49/06* (2006.01)
(Continued)

(52) U.S. Cl.
CPC .......... *F04B 49/20* (2013.01); *F04B 11/0041* (2013.01); *F04B 41/06* (2013.01);
(Continued)

(58) Field of Classification Search
CPC ........ F04B 49/20; F04B 49/065; F04B 49/08; F04B 49/106; F04B 41/06; F04B 11/0041;
(Continued)

(56) References Cited

U.S. PATENT DOCUMENTS

| | | | |
|---|---|---|---|
| 4,494,382 A * | 1/1985 | Raymond | F25B 5/00 417/280 |
| 6,330,804 B1 | 12/2001 | Uno et al. | |
| 6,568,197 B2 * | 5/2003 | Uno | F25B 49/022 62/175 |
| 2003/0123989 A1* | 7/2003 | Holden | F04B 41/06 417/2 |

(Continued)

FOREIGN PATENT DOCUMENTS

| | | |
|---|---|---|
| CN | 1467443 A | 1/2004 |
| CN | 1590769 A | 3/2005 |

(Continued)

*Primary Examiner* — Charles G Freay
(74) *Attorney, Agent, or Firm* — KILPATRICK TOWNSEND & STOCKTON, LLP (57) ABSTRACT

A method and a device for controlling a capacity change of a compressor, and a smart home appliance. The method includes: determining whether a capacity of the compressor is required to be changed; if yes, determining an intermediate frequency; changing the capacity of the compressor while maintaining the operating frequency of the compressor at the intermediate frequency; and the maintaining the operating frequency of the compressor at the intermediate frequency reduces a sudden change in output of the compressor after the changing the capacity.

15 Claims, 4 Drawing Sheets

(51) Int. Cl.
  *F04B 41/06* (2006.01)
  *F04C 28/06* (2006.01)
  *F04B 49/10* (2006.01)
  *F04B 49/08* (2006.01)
  *F04B 11/00* (2006.01)
  *F25B 49/02* (2006.01)
  *F04C 28/18* (2006.01)

(52) U.S. Cl.
  CPC .......... *F04B 49/065* (2013.01); *F04B 49/08* (2013.01); *F04B 49/106* (2013.01); *F04B 2201/0207* (2013.01); *F04B 2205/01* (2013.01); *F04B 2205/05* (2013.01); *F04C 28/065* (2013.01); *F04C 28/18* (2013.01); *F25B 49/022* (2013.01); *F25B 2600/025* (2013.01)

(58) Field of Classification Search
  CPC .......... F04B 2201/0207; F04B 2205/01; F04B 2205/05; F04C 28/065; F04C 28/18; F25B 49/022; F25B 2600/025
  See application file for complete search history.

(56) References Cited

U.S. PATENT DOCUMENTS

| | | | |
|---|---|---|---|
| 2008/0260545 A1* | 10/2008 | Frokjaer | F04B 49/20 417/212 |
| 2016/0187893 A1* | 6/2016 | Bergh | G05D 16/2046 137/565.11 |
| 2017/0292522 A1* | 10/2017 | Goodfellow | F04B 41/00 |

FOREIGN PATENT DOCUMENTS

| | | |
|---|---|---|
| CN | 102705212 A | 10/2012 |
| CN | 103884081 A | 6/2014 |
| CN | 104047843 A | 9/2014 |
| CN | 104654516 A | 5/2015 |
| CN | 105423666 A | 3/2016 |
| CN | 106871386 A | 6/2017 |
| CN | 106885348 A | 6/2017 |
| CN | 107860161 A | 3/2018 |
| CN | 109026712 A | 12/2018 |
| EP | 0731325 A2 | 9/1996 |
| JP | H05164045 A | 6/1993 |
| WO | 2008016227 A1 | 2/2008 |

* cited by examiner

METHOD AND DEVICE FOR CONTROLLING CAPACITY CHANGE OF COMPRESSOR, AND SMART HOME APPLIANCE

This application is a national phase entry under 35 U.S.C § 371 of the International Application No. PCT/CN2018/122913, filed on Dec. 22, 2018, which claims the priority of China patent application No. 201810674845.7, titled "METHOD AND DEVICE FOR CONTROLLING CAPACITY CHANGE OF COMPRESSOR, AND SMART HOME APPLIANCE", filed before China National Intellectual Property Administration on Jun. 27, 2018, and the content thereof is incorporated in its entirety herein by reference.

FIELD

The present disclosure relates to the field of intelligent control of compressor, and in particular, to a method and a device for controlling a capacity change of a compressor, and a smart home appliance.

BACKGROUND

Compared with household single-split air conditioners, household central air conditioners still have some inherent drawbacks, of which the most significant one is a higher energy consumption. A previous report indicates that in 60% of the operating time, household multi-split air conditioners are usually in operation with only one device, and in about 60% of the time, they are in operation at 30% of full loads. Furthermore, the compressors under low loads are in a low-frequency operation state, so that the operating efficiencies of the motors in this state will be reduced, and the overall efficiencies of the compressors will be correspondingly reduced. Moreover, temperature fluctuations and energy consumptions will increase with the repeated on and off of the compressors.

How to improve the operating efficiencies of the household multi-split air conditioners through technological innovation is a problem to be addressed in the industry. In view of this, a variable-frequency and variable-capacity technology has been researched and developed in the field of household central air conditioning. The household central air conditioner with the variable-frequency and variable-capacity technology adopts an operating mode switched between a single-cylinder mode and a double-cylinder mode, so that the compressor can meet the operating requirements under different conditions, which solves two critical problems in the household multi-split products, the over-large minimum outputs and the low energy efficiencies at low loads. In short, when two or more indoor devices are in operation, the compressor operates in the double-cylinder mode to achieve normal cooling or heating. When only one indoor device is in operation, the compressor operates in the single-cylinder mode to not only satisfy the demands on normal cooling or heating, but also save the electricity expenses to the greatest extent, and to avoid the waste like "using a big horse to draw a little wagon". Moreover, in the low-load operation state, the compressor can maintain stable operation in the single-cylinder operation mode, and avoiding temperature fluctuations and noises occurred during on and off of the compressor, and improving the comfortability.

SUMMARY

The present disclosure provides a method and a device for controlling a capacity change of a compressor, and a smart home appliance.

According to a first aspect of embodiments of the present disclosure, a method for controlling a capacity change of a compressor is provided, the method including:
  determining whether a capacity of the compressor is required to be changed; if yes, determining an intermediate frequency;
  changing the capacity of the compressor while maintaining an operating frequency of the compressor at the intermediate frequency;
  and the maintaining the operating frequency of the compressor at the intermediate frequency reduces a sudden change in output of the compressor after the changing the capacity.

In some embodiments, the determining the intermediate frequency includes:
  when the capacity is to be changed from high to low, selecting a smaller one from a first frequency, before a frequency change, of the compressor, and a second frequency, after the frequency change, of the compressor, as the intermediate frequency;
  when the capacity is to be changed from low to high, selecting a frequency smaller than the first frequency as the intermediate frequency.

In some embodiments, when the capacity is to be changed from high to low, the changing the capacity of the compressor includes:
  when the first frequency is selected as the intermediate frequency, changing the capacity of the compressor while maintaining the operating frequency of the compressor at the first frequency;
  when the second frequency is selected as the intermediate frequency, switching the operating frequency of the compressor to the second frequency, and changing the capacity of the compressor while maintaining the operating frequency of the compressor at the second frequency.

In some embodiments, when the first frequency is selected as the intermediate frequency, the changing the capacity of the compressor while maintaining the operating frequency of the compressor at the first frequency includes:
  after the changing the capacity of the compressor, determining whether a system pressure is stable; and if yes, switching the operating frequency of the compressor to the second frequency.

In some embodiments, when the second frequency is selected as the intermediate frequency, the switching the operating frequency of the compressor to the second frequency, and the changing the capacity of the compressor while maintaining the operating frequency of the compressor at the second frequency specifically includes:
  switching the operating frequency of the compressor to the second frequency; maintaining the operating frequency at the second frequency while determining whether the system pressure is stable; if yes, changing the capacity of the compressor.

In some embodiments, when the capacity is to be changed from low to high, the changing the capacity of the compressor includes:
  switching the operating frequency of the compressor from the first frequency to the intermediate frequency within a preset period of time;
  changing the capacity of the compressor while maintaining the operating frequency of the compressor at the intermediate frequency.

In some embodiments, the method for controlling the capacity change further includes:

after the changing the capacity of the compressor, and when the intermediate frequency is not equal to the second frequency, switching the operating frequency of the compressor from the intermediate frequency to the second frequency.

In some embodiments, the determining whether the system pressure is stable includes:

acquiring a first amount of change and a second amount of change, and determining whether the first amount of change is less than a preset first threshold and whether the second amount of change is less than a preset second threshold;

if yes, determining that the system pressure is stable, and the first amount of change is an amount of change of a high-side pressure of the compressor during a first preset period of time, and the second amount of change is an amount of change of a low-side pressure of the compressor during a second preset period of time.

In some embodiments, the selecting the frequency smaller than the first frequency as the intermediate frequency includes:

setting the first frequency multiplied by a coefficient of proportionality as the intermediate frequency, and the coefficient of proportionality is a ratio of the capacity of the compressor before the changing the capacity to the capacity of the compressor after the changing the capacity.

According to a second aspect of the embodiments of the present disclosure, a device for controlling a capacity change of a compressor is provided, the device including:

a determination device configured to determine whether a capacity of the compressor is required to be changed, and if yes, to determine an intermediate frequency;

a capacity changing device configured to change the capacity of the compressor while maintaining an operating frequency of the compressor at the intermediate frequency; and and the maintaining the operating frequency of the compressor at the intermediate frequency reduces a sudden change in output of the compressor after the capacity change.

According to a third aspect of the embodiments of the present disclosure, a smart home appliance is provided, including:

a compressor;

a processor; and a memory storing instructions that are executable by the processor;

and the processor is configured for:

determining whether a capacity of the compressor is required to be changed; if yes, determining an intermediate frequency;

changing the capacity of the compressor while maintaining an operating frequency of the compressor at the intermediate frequency;

and the maintaining the operating frequency of the compressor at the intermediate frequency reduces a sudden change in output of the compressor after the changing the capacity.

The embodiments of the present disclosure include the following beneficial effects:

By determining the intermediate frequency and changing the capacity of the compressor while maintaining the operating frequency of the compressor at the intermediate frequency, the sudden change in output of the compressor after the capacity change is reduced, and avoiding the impact on the compressor caused by the sudden increase or sudden decrease of the discharge capacity of the compressor, which improves the stability of the system and guarantees the success of the capacity change.

It should be understood that the above general description and the following detailed description are only exemplary and explanatory, and not intended to limit the present disclosure.

BRIEF DESCRIPTION OF THE DRAWINGS

The drawings herein are incorporated into the specification and constitute a part of the specification, showing embodiments in accordance with the present disclosure, and together with the specification are used to explain the principle of the present disclosure.

DETAILED DESCRIPTION OF THE EMBODIMENTS

Exemplary embodiments will be described here in detail, and examples thereof are shown in the accompanying drawings. Unless otherwise indicated, when the following description refers to the drawings, the same reference numbers in different drawings indicate the same or similar elements. The implementations described in the following exemplary embodiments do not represent all implementations consistent with the present disclosure. Rather, they are merely examples of devices and methods consistent with some aspects of the present disclosure as detailed in the appended claims.

In related art of variable-frequency and variable-capacity technology in the field of household central air conditioning, a non-properly changed capacity will easily result in unstable system pressure, or even damage the compressor or the compressor drive plate. For example, in the case that the compressor is running with a single compression cylinder at 40 Hz, and suddenly needs to operate with two compression cylinders to increase the compression capacity, the discharge capacity of the compressor will be instantly doubled if the single-cylinder mode is suddenly switched to the double-cylinder mode at 40 Hz, which causes the unstable system pressure or capacity switching failure, or even damages the compressor or the compressor drive plate. The same problem also occurs during the switching from the double-cylinder mode to the single-cylinder mode: the output of the compressor is greatly reduced in a short time, causing the system to be unstable.

Figure 1:
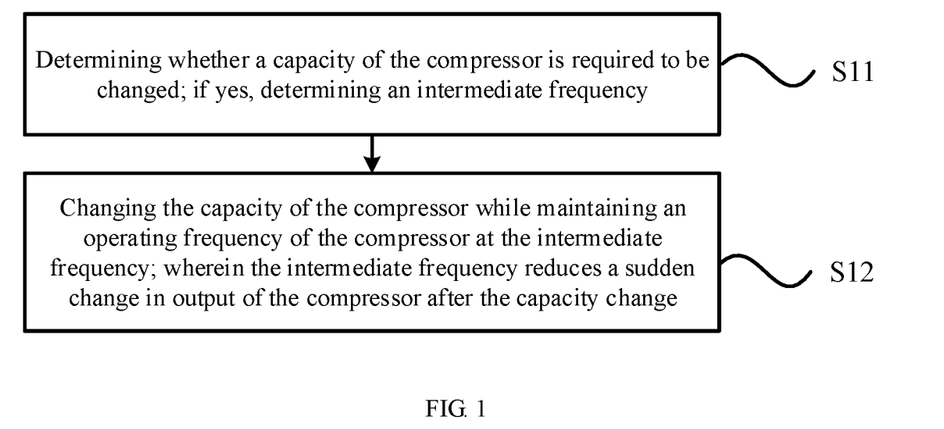
FIG. 1 is a flow chart showing a method for controlling a capacity change of a compressor according to an exemplary embodiment.

FIG. 1 is a flow chart showing a method for controlling a capacity change of a compressor according to an exemplary embodiment. As shown in FIG. 1, the method includes following steps:

Step S11, determining whether a capacity of the compressor is required to be changed; if yes, determining an intermediate frequency;

Step S12, changing the capacity of the compressor while maintaining an operating frequency of the compressor at the intermediate frequency;

and the maintaining the operating frequency of the compressor at the intermediate frequency reduces a sudden change in output of the compressor after the capacity change.

It can be understood that the capacity change of the compressor includes two situations: changing from a high capacity to a low capacity, and changing from a low capacity to a high capacity. In some embodiments, whether the compressor is required to be changed in capacity is determined by determining whether the load of the compressor is changed. For example, when it is detected that the load of the compressor decreases, it is determined that the compressor has to be changed from a high capacity to a low capacity. When it is detected that the load of the compressor increases, it is determined that the compressor has to be changed from a low capacity to a high capacity.

The change from a high capacity to a low capacity includes, but is not limited to, changing the compressor from operating with two cylinders to operating with a single cylinder, changing the compressor from operating with three cylinders to operating with two cylinders, changing the compressor from operating with four cylinders to operating with three cylinders, changing the compressor from operating with five cylinders to operating with two cylinders, and the like.

The change from a low capacity to a high capacity includes, but is not limited to, changing the compressor from operating with a single cylinder to operating with two cylinders, changing the compressor from operating with two cylinders to operating with three cylinders, changing the compressor from operating with three cylinders to operating with four cylinders, changing the compressor from operating with two cylinders to operating with five cylinders, and the like.

In the present embodiment, by determining the intermediate frequency and changing the capacity of the compressor while maintaining the operating frequency of the compressor at the intermediate frequency, the sudden change in output of the compressor after the capacity change is reduced, and avoiding the impact on the compressor caused by a sudden increase or a sudden decrease of the discharge capacity of the compressor, which improves the stability of the system and guarantees the success of the capacity change.

In some embodiments, when a frequency of the compressor is further required to be changed, the determining the intermediate frequency includes:

when the capacity is to be changed from high to low, selecting a smaller one from a first frequency, before a frequency change, of the compressor, and a second frequency, after the frequency change, of the compressor, as the intermediate frequency;

when the capacity is to be changed from low to high, selecting a frequency smaller than the first frequency as the intermediate frequency.

It is ensured that the capacity of the compressor is changed at a relatively small frequency by selecting a smaller one from the first frequency, before the frequency change, of the compressor, and the second frequency, after the frequency change, of the compressor, as the intermediate frequency when the capacity is to be changed from high to low, and by selecting the frequency smaller than the first frequency as the intermediate frequency when the capacity is to be changed from low to high. Compared with that the capacity is directly changed without comparing the first frequency with the second frequency before changing the capacity in the related art, the method of the present embodiment reduces the sudden change in output of the compressor.

In some embodiments, the selecting the frequency smaller than the first frequency as the intermediate frequency includes:

setting the first frequency multiplied by a coefficient of proportionality as the intermediate frequency, and the coefficient of proportionality is a ratio of the capacity of the compressor before the changing the capacity to the capacity of the compressor after the changing the capacity.

It should be noted that, in specific practices, the coefficient of proportionality is adjustable in accordance with the practical output of the compressor, and ensuring a maximal reduction of the sudden change in output of the compressor after the capacity change.

In some embodiments, when the capacity is to be changed from high to low, the changing the capacity of the compressor includes:

when the first frequency is selected as the intermediate frequency, changing the capacity of the compressor while maintaining the operating frequency of the compressor at the first frequency;

when the second frequency is selected as the intermediate frequency, switching the operating frequency of the compressor to the second frequency, and changing the capacity of the compressor while maintaining the operating frequency at the second frequency.

To facilitate the understanding, the case where the high capacity is changed to the low capacity, for example, by changing the compressor operated with from two cylinders to a single cylinder, is explained as follows.

Assuming that before the capacity change, the capacity of the compressor is a plus b, and the first frequency is X; after the capacity change, the compressor is operated in a single-cylinder mode, the capacity is a, and the second frequency is Y; if X>Y, the second frequency Y is selected as the intermediate frequency; if X≤Y, the first frequency X is selected as the intermediate frequency.

In the case where X>Y, the operating frequency of the compressor is firstly switched to the second frequency Y, and the capacity of the compressor is then changed by switching the operating mode of the compressor from the two-cylinder mode to the single-cylinder mode while the operating frequency is maintained at the second frequency Y.

In the case where X≤Y, the capacity of the compressor is firstly changed by switching the operating mode of the compressor from the two-cylinder mode to the single-cylinder mode while the operating frequency of the compressor is maintained at the first frequency X.

If X>Y, in the related art, the capacity change and the frequency change are performed directly at the frequency X. Prior to the capacity change, the output of the compressor is X*(a+b). After the capacity change and the frequency change, the output of the compressor is Y*a. Whereas, if X>Y, in the present embodiment, the second frequency Y which is the lower frequency is selected as the intermediate frequency; the operating frequency of the compressor is firstly reduced from the first frequency X to the second frequency Y, at which time the output of the compressor is Y*(a+b); then, the capacity is changed at the second frequency Y, at which time the output of the compressor is Y*a.

Compared with the related art that the output of the compressor changes directly from $X*(a+b)$ to $Y*a$, the output of the compressor, in the present embodiment, changes from $Y*(a+b)$ to $Y*a$. Obviously, due to $X>Y$, after the capacity change, the sudden change in output of the compressor is reduced in the present embodiment.

If $X \leq Y$, in the related art, the capacity change and the frequency change are performed directly at the frequency X. Prior to the capacity change, the output of the compressor is $X*(a+b)$. After the capacity change and the frequency change, the output of the compressor is $Y*a$. Whereas, if $X \leq Y$, in the present embodiment, the first frequency X which is the lower frequency is selected as the intermediate frequency. The capacity is firstly changed at the first frequency X, at which time the output of the compressor is $X*a$. Then, the frequency of the compressor increases from the first frequency X to the second frequency Y, at which time the compressor output is $Y*a$. Compared with the related art that the output of the compressor changes directly from $X*(a+b)$ to $Y*a$, the output of the compressor, in the present embodiment, changes from $X*a$ to $Y*a$. Obviously, the sudden change in output of the compressor is reduced in the present embodiment.

In some embodiments, when the first frequency is selected as the intermediate frequency, the changing the capacity of the compressor while maintaining the operating frequency of the compressor at the first frequency includes:
   after the changing the capacity of the compressor, determining whether a system pressure is stable; and if yes, switching the operating frequency of the compressor to the second frequency.

When the second frequency is selected as the intermediate frequency, the switching the operating frequency of the compressor to the second frequency, and the changing the capacity of the compressor while maintaining the operating frequency at the second frequency specifically includes:
   switching the operating frequency of the compressor to the second frequency; maintaining the operating frequency at the second frequency while determining whether the system pressure is stable; if yes, changing the capacity of the compressor.

It can be understood that when the high capacity is changed to the low capacity, the discharge capacity of the compressor decreases, and the low-side pressure of the compressor increases (in normal operation, the low-side pressure should decrease). In this case, the damage, caused by directly changing the capacity, to the system is very large; therefore, the capacity change of the compressor should be proceeded after that the operating frequency is maintained at the second frequency and it is determined that the system pressure is stable. When the low capacity is changed to the high capacity, the discharge capacity of the compressor increases, and the low-side pressure of the compressor decreases. In this case, the direct capacity change will substantially not damage the system; therefore, the capacity change of the compressor is capable of being proceeded as long as the operating frequency of the compressor is maintained at the intermediate frequency, and there is no need to maintain the operating frequency of the compressor at the intermediate frequency and determine that the system pressure is stable prior to the capacity change of the compressor. The present embodiment takes into account the difference in discharge capacity and the difference in low-side pressure change between the two different situations that the high capacity is to be changed to the low capacity and the low capacity is to be changed to the high capacity, and performs the capacity change step differently, to improve the stability of the system and guarantee the success of the capacity change.

In some embodiments, when the capacity is to be changed from low to high, the changing the capacity of the compressor includes:
   switching the operating frequency of the compressor from the first frequency to the intermediate frequency within a preset period of time;
   changing the capacity of the compressor while maintaining the operating frequency of the compressor at the intermediate frequency.

It should be noted that the preset period of time is a very short period of time. For example, when it is determined that the capacity needs to be changed, the operating frequency is quickly switched from the first frequency to the intermediate frequency.

Taking the switching from the single-cylinder mode to the two-cylinder mode as an example, an elaboration is made as follows.

Assuming that before the capacity change, the compressor operates with a single cylinder having the capacity of a, and the first frequency is X; after the capacity change, the compressor operates with two cylinders, the capacity of the compressor is a plus b, and the second frequency is Y; $Z=X*a/(a+b)$ is then selected as the intermediate frequency.

When there is a need to switch the compressor from the single-cylinder mode to the two-cylinder mode, the operating frequency of the compressor is first quickly switched from X to the intermediate frequency $Z=X*a/(a+b)$. Then, while maintaining the operating frequency at the intermediate frequency Z, the capacity of the compressor is changed by switching from the single-cylinder mode to the two-cylinder mode.

It can be understood that, in the related art, the capacity change and the frequency change are proceeded directly at the frequency X. The output of the compressor is $X*a$ before the capacity change, and the output of the compressor is $Y*(a+b)$ after the capacity change and the frequency change. In the present embodiment, a frequency $Z=X*a/(a+b)$ that is lower than not only the first frequency but also the second frequency is selected as the intermediate frequency; the operating frequency is firstly reduced from the first frequency X to the intermediate frequency Z, at which time the compressor output is $Z*a$; and then the capacity of the compressor is changed at the intermediate frequency Z, at which time the output of the compressor is $Y*(a+b)$. Compared with the related art that the output of the compressor changes directly from $X*a$ to $Y*(a+b)$, the output of the compressor, in the present embodiment, changes from $Z*a$ to $Y*(a+b)$. Obviously, due to $Z<X$, after the capacity change, the sudden change in output of the compressor is reduced the present embodiment.

In some embodiments, the operating frequency is quickly reduced from the first frequency X to the intermediate frequency Z ($Z=Y*a/(a+b)$), and the capacity change is proceeded at the intermediate frequency Z. Since the period of time for changing the operating frequency from the first frequency X to the intermediate frequency Z is very short, the output of the compressor is still maintained at $X*a$ within the period of time, so that the sudden change in output of the compressor after the capacity change is relatively small and the system is more stable.

In some embodiments, the method for controlling the capacity change further includes:
   after the changing the capacity of the compressor, and when the intermediate frequency is not equal to the second frequency, switching the operating frequency of the compressor from the intermediate frequency to the second frequency.

It can be understood that when the capacity is changed from low to high, since the intermediate frequency is not equal to the second frequency, the operating frequency of the compressor needs to be switched from the intermediate frequency to the second frequency after the capacity change; when the capacity is changed from high to low, and if the first frequency is selected as the intermediate frequency, and the first frequency is not equal to the second frequency, the operating frequency of the compressor needs to be switched from the intermediate frequency (i.e. the first frequency) to the second frequency after the capacity change.

In some embodiments, the determining whether the system pressure is stable includes:

acquiring a first amount of change and a second amount of change, and determining whether the first amount of change is less than a preset first threshold, and whether the second amount of change is less than a preset second threshold; if yes, determining that the system pressure is stable, and the first amount of change is an amount of change of a high-side pressure of the compressor during a first preset period of time, and the second amount of change is an amount of change of a low-side pressure of the compressor during a second preset period of time.

In some embodiments, the first threshold and the second threshold are equal to each other, or not. The first preset period of time and the second preset period of time are equal to each other, or not. The first threshold and the second threshold, the first preset period of time and the second preset period of time are set according to historical experience data or according to experimental data.

Figure 2:
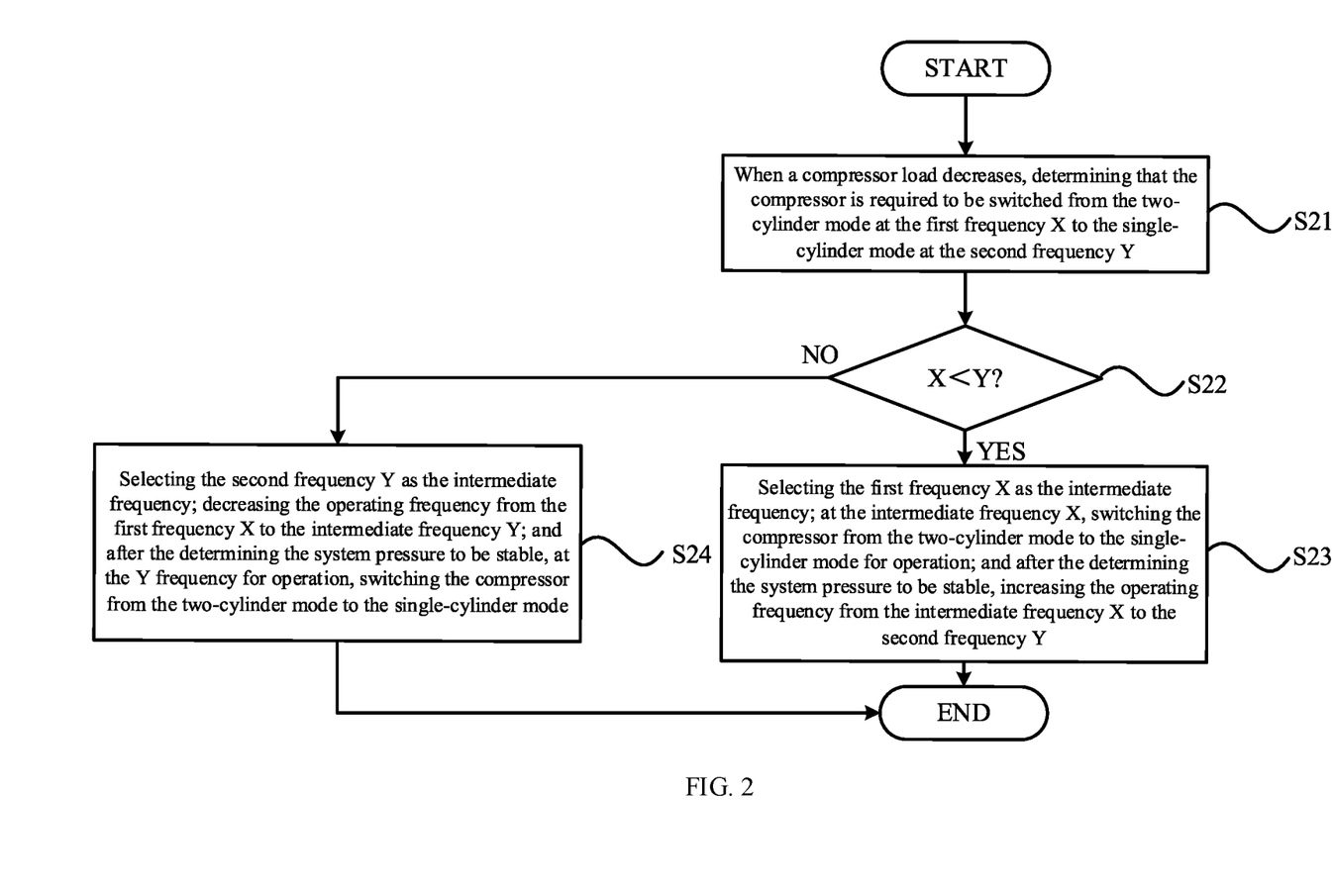
FIG. 2 is a flow chart showing the method for controlling the capacity change of the compressor according to another exemplary embodiment.

FIG. 2 is a flow chart showing the method for controlling the capacity change, by changing from the two-cylinder mode to the single-cylinder mode, of the compressor according to another exemplary embodiment. In this embodiment, assuming that the first frequency prior to the capacity change is X, and the second frequency after the capacity change is Y, the method includes following steps, as shown in FIG. 2.

At step S21, when a compressor load decreases, it is determined that the compressor is required to be switched from the two-cylinder mode at the first frequency X to the single-cylinder mode at the second frequency Y.

At step S22, X is compared with Y.

At step S23, if X<Y, the first frequency X is selected as the intermediate frequency; at the intermediate frequency X, the compressor is switched from the two-cylinder mode to the single-cylinder mode for operation; and after the system pressure is determined to be stable, the operating frequency is increased from the intermediate frequency X to the second frequency Y.

At step S24, if X>Y, the second frequency Y is selected as the intermediate frequency; the operating frequency is decreased from the first frequency X to the intermediate frequency Y; and after the system pressure is determined to be stable, at the Y frequency for operation, the compressor is switched from the two-cylinder mode to the single-cylinder mode.

In the present embodiment, by determining the intermediate frequency and changing the capacity of the compressor while maintaining the operating frequency of the compressor at the intermediate frequency, the sudden change in output of the compressor after the capacity change is reduced, and avoiding the impact on the compressor caused by a sudden increase or a sudden decrease of the discharge capacity of the compressor, which improves the stability of the system and guarantees the success of the capacity change.

Further, the present embodiment takes into the account the case that when the two-cylinder mode is changed to the single-cylinder mode, the discharge capacity of the compressor decreases, and the low-side pressure of the compressor increases (in the normal operation, the low-side pressure should decrease). In this case, the damage, caused by directly changing the capacity, to the system is very large; therefore, the capacity change of the compressor should be proceeded after that the operating frequency is maintained at the intermediate frequency and it is determined that the system pressure is stable; or, the frequency change of the compressor should be proceeded after that the capacity of the compressor is changed and it is determined that the system pressure is stable, which further improves the stability of the system, and guarantee the success of the capacity change.

Figure 3:
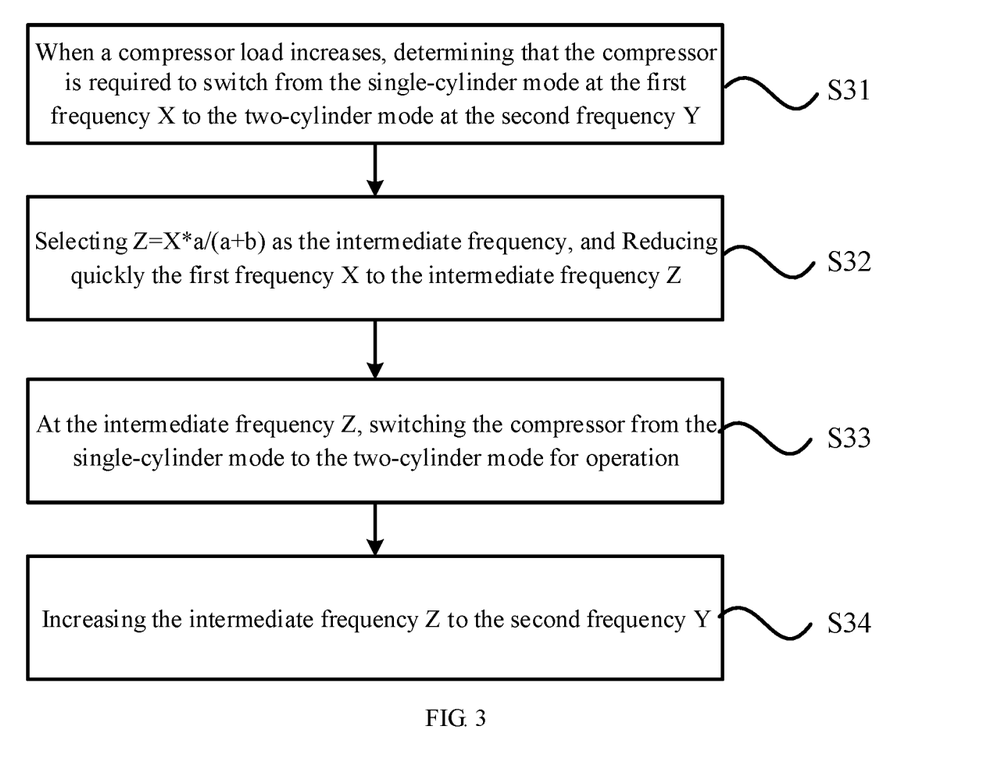
FIG. 3 is a flow chart showing the method for controlling the capacity change of the compressor according to yet another exemplary embodiment.

FIG. 3 is a flow chart showing the method for controlling the capacity change, changing from the single-cylinder mode to the two-cylinder mode, of the compressor according to another exemplary embodiment. In this embodiment, assuming that the first frequency before the capacity change is X, and the second frequency after the capacity change is Y, the method includes following steps, as shown in FIG. 3.

At step S31, when a compressor load increases, it is determined that the compressor is required to switch from the single-cylinder mode at the first frequency X to the two-cylinder mode at the second frequency Y.

At step S32, Z=X*a/(a+b) is selected as the intermediate frequency, and the first frequency X is quickly reduced to the intermediate frequency Z.

At step S33, at the intermediate frequency Z, the compressor is switched from the single-cylinder mode to the two-cylinder mode for operation.

At step S34, the intermediate frequency Z is increased to the second frequency Y.

In the present embodiment, by determining the intermediate frequency and changing the capacity of the compressor while maintaining the operating frequency of the compressor at the intermediate frequency, the sudden change in output of the compressor after the capacity change is reduced, and avoiding the impact on the compressor caused by a sudden increase or a sudden decrease of the discharge capacity of the compressor, which improves the stability of the system and guarantees the success of the capacity change.

It should be noted that the methods for controlling the capacity change shown in FIG. 2 and FIG. 3 are only examples, and do not intent to limit the technical solutions provided by the embodiments to the steps and processes shown in FIG. 2 and FIG. 3.

In addition, it should be noted that the method for controlling the capacity change exemplified by switching from the two-cylinder mode to the single-cylinder mode shown in FIG. 2 is also suitable for any other capacity change scenario to change the compressor capacity from high to low; and the method for controlling the capacity change exemplified by switching from the single-cylinder mode to the two-cylinder mode shown in FIG. 3 is also suitable for any other capacity change scenario to change the compressor capacity from low to high.

Figure 4:
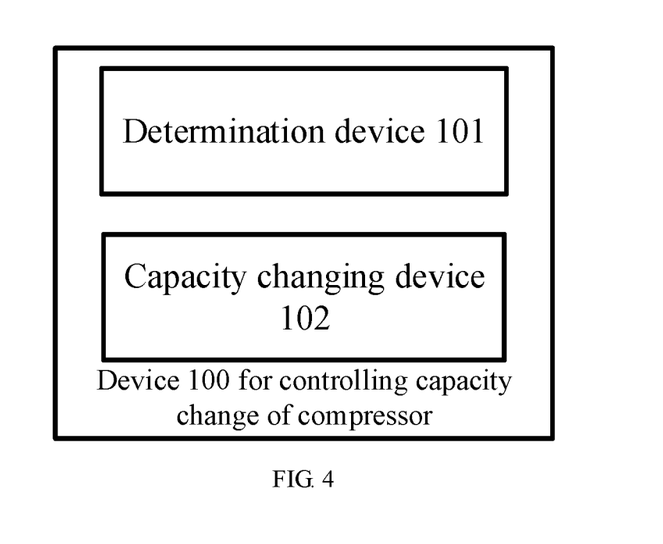
FIG. 4 is a schematic block diagram showing a device for controlling a capacity change of a compressor according to an exemplary embodiment.

FIG. 4 is a schematic block diagram showing a device for controlling a capacity change of a compressor according to an exemplary embodiment. Referring to FIG. 4, the device 100 includes:

a determination device 101 configured to determine whether a capacity of the compressor is required to be changed, and if yes, to determine an intermediate frequency;

a capacity changing device 102 configured to change the capacity of the compressor while maintaining an operating frequency of the compressor at the intermediate frequency; and and the maintaining the operating frequency of the compressor at the intermediate frequency reduces a sudden change in output of the compressor after the capacity change.

In the present embodiment, by determining the intermediate frequency and changing the capacity of the compressor while maintaining the operating frequency of the compressor at the intermediate frequency, the sudden change in output of the compressor after the capacity change is reduced, and avoiding the impact on the compressor caused by a sudden increase or a sudden decrease of the discharge capacity of the compressor, which improves the stability of the system and guarantees the success of the capacity change.

In some embodiments, the determination device 101 is specifically configured for:

when the capacity is to be changed from high to low, selecting a smaller one from a first frequency, before a frequency change, of the compressor, and a second frequency, after the frequency change, of the compressor, as the intermediate frequency;

when the capacity is to be changed from low to high, selecting a frequency smaller than the first frequency as the intermediate frequency.

In some embodiments, when the capacity is to be changed from high to low, the capacity changing device 102 is specifically configured for:

when the first frequency is selected as the intermediate frequency, changing the capacity of the compressor while maintaining the operating frequency of the compressor at the first frequency;

when the second frequency is selected as the intermediate frequency, switching the operating frequency of the compressor to the second frequency, and changing the capacity of the compressor while maintaining the operating frequency at the second frequency.

In some embodiments, when the first frequency is selected as the intermediate frequency, the changing the capacity of the compressor while maintaining the operating frequency of the compressor at the first frequency includes:

after the changing the capacity of the compressor, determining whether a system pressure is stable; and if yes, switching the operating frequency of the compressor to the second frequency.

In some embodiments, when the second frequency is selected as the intermediate frequency, the switching the operating frequency of the compressor to the second frequency, and the changing the capacity of the compressor while maintaining the operating frequency at the second frequency specifically includes:

switching the operating frequency of the compressor to the second frequency, maintaining the operating frequency at the second frequency while determining whether the system pressure is stable; if yes, changing the capacity of the compressor.

In some embodiments, when the capacity is to be changed from low to high, the capacity changing device 102 is specifically configured for:

switching the operating frequency of the compressor from the first frequency to the intermediate frequency within a preset period of time;

changing the capacity of the compressor while maintaining the operating frequency of the compressor at the intermediate frequency.

Figure 5:
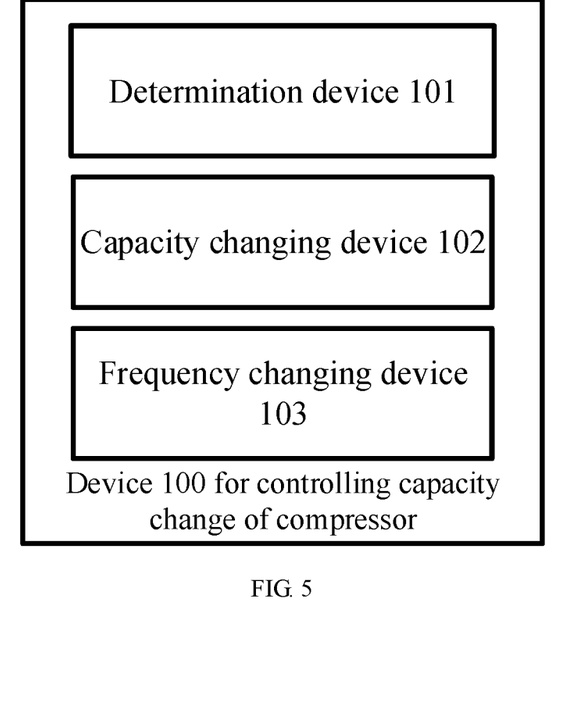
FIG. 5 is a schematic block diagram showing the device for controlling the capacity change of the compressor according to another exemplary embodiment.

Referring to FIG. 5, in some embodiments, the device 100 for controlling the capacity change further includes:

a frequency changing device 103 configured to switch the operating frequency of the compressor from the intermediate frequency to the second frequency after the changing the capacity of the compressor and when the intermediate frequency is not equal to the second frequency.

In some embodiments, the determining whether the system pressure is stable includes:

acquiring a first amount of change and a second amount of change, and determining whether the first amount of change is less than a preset first threshold, and whether the second amount of change is less than a preset second threshold; if yes, determining that the system pressure is stable, and the first amount of change is an amount of change of a high-side pressure of the compressor during a first preset period of time, and the second amount of change is an amount of change of a low-side pressure of the compressor within a second preset period of time.

In some embodiments, the selecting the frequency smaller than the first frequency as the intermediate frequency includes:

setting the first frequency multiplied by a coefficient of proportionality as the intermediate frequency, and the coefficient of proportionality is a ratio of the capacity of the compressor before the changing the capacity to the capacity of the compressor after the changing the capacity.

The embodiment takes into account the difference in discharge capacity and the difference in low-side pressure change between the two different situations that the high capacity is to be changed to the low capacity and the low capacity is to be changed to the high capacity, and performs the capacity change step differently, to improve the stability of the system and guarantee the success of the capacity change.

A smart home appliance is provided according to another exemplary embodiment. The smart home appliance includes:

a compressor;

a processor; and a memory for storing instructions that are executable by the processor;

and the processor is configured for:

determining whether a capacity of the compressor is required to be changed; if yes, determining an intermediate frequency;

changing the capacity of the compressor while maintaining an operating frequency of the compressor at the intermediate frequency;

and the maintaining the operating frequency of the compressor at the intermediate frequency reduces a sudden change in output of the compressor after the changing the capacity.

In some embodiments, the smart home appliance includes at least one of an air conditioner, a refrigerator, and a freezer.

In the present embodiment, by determining the intermediate frequency and changing the capacity of the compressor while maintaining the operating frequency of the compressor at the intermediate frequency, the sudden change in output of the compressor after the capacity change is reduced, and avoiding the impact on the compressor caused by the sudden increase or sudden decrease of the discharge capacity of the compressor, which improves the stability of the system and guarantees the success of the capacity change.

It can be understood that the same or similar parts in the above-described embodiments can be referred to each other, and the contents not described in details in some embodiments can refer to the same or similar contents in other embodiments.

It should be noted that in the description of the present disclosure, the terms "first", "second", or the like, are only used for descriptive purposes, and cannot be constructed as indicating or implying relative importance. In addition, in the description of the present disclosure, unless otherwise specified, the term "plurality" means at least two.

Any process or method described in the flowcharts or described in other ways herein can be understood as a module, a segment, or a section of codes that include one or more executable instructions for implementing specific logical functions or steps of the process. The scope of the embodiments of the present disclosure may include additional implementations, in which functions may be performed not in the shown or described order, and may be performed a substantially simultaneous manner or in a reverse order, depending on the functionality involved.

It should be understood that each part of the present disclosure can be implemented by hardware, software, firmware or a combination thereof. In the above embodiments, a plurality of steps or methods can be implemented by software or firmware stored in the memory and executed by a suitable instruction execution system. For example, if it is implemented by hardware, as in another implementation, the steps or methods can be implemented by any single one or a combination of the following technologies known in the art: a discrete logic circuit with a logic gate circuit for implementing a logic function on a data signal, an application-specific integrated circuit (ASIC) with a suitable combinational logic gate circuit, a programmable gate array (PGA), a field programmable gate array (FPGA), and the like.

All or a part of the steps performed in the method of the above embodiments can be implemented by instructing the related hardware with a program. The program can be stored in a computer-readable storage medium. When the program is executed, one or a combination of the steps of the method embodiments will be performed.

In addition, each functional device in the various embodiments of the present disclosure may be integrated into one processing module, or each device may exist alone physically, or two or more devices may be integrated into one module. The above-mentioned integrated modules can be implemented in the form of hardware or software functional modules. If the integrated module is implemented in the form of the software function module and sold or used as an individual product, the integrated module may be stored in a computer readable storage medium.

The above-described storage medium may be a read-only memory, a magnetic disk, or an optical disk, and the like.

In the description of the present specification, the reference terms "an embodiment", "some embodiments", "an example", "an specific example", or "some examples", and the like mean that specific features, structures, materials or characteristics described in these embodiments or examples are included in at least one embodiment or example of the present disclosure. In the present specification, the above-mentioned terms do not necessarily refer to the same embodiment or example. Moreover, the described specific features, structures, materials or characteristics may be combined in any one or more embodiments or examples in a proper manner.

What is claimed is:

1. A method for controlling a capacity change of a compressor, the method comprising:
    determining whether a capacity of the compressor is required to be changed; if yes, determining a capacity-change frequency;
    changing the capacity of the compressor while an operating frequency of the compressor is at the capacity-change frequency;
    wherein the determining the capacity-change frequency comprises:
    determining whether the capacity of the compressor is required to be changed to increase or decrease;
    when the capacity is to be changed to decrease, selecting a smaller one from a first frequency, before a frequency change, of the compressor, and a second frequency, after the frequency change, of the compressor, as the capacity-change frequency; and
    when the capacity is to be changed to increase, selecting a frequency smaller than the first frequency as the capacity-change frequency.

2. The method of claim 1, wherein when the capacity is to be changed to decrease, the changing the capacity of the compressor comprises:
    when the first frequency is selected as the capacity-change frequency, changing the capacity of the compressor while maintaining the operating frequency of the compressor at the first frequency; and
    when the second frequency is selected as the capacity-change frequency, switching the operating frequency of the compressor to the second frequency, and changing the capacity of the compressor while maintaining the operating frequency of the compressor at the second frequency.

3. The method of claim 2, wherein when the first frequency is selected as the capacity-change frequency, the changing the capacity of the compressor while maintaining the operating frequency of the compressor at the first frequency comprises:
    after the changing the capacity of the compressor, determining whether a system pressure is stable; and if yes, switching the operating frequency of the compressor to the second frequency.

4. The method of claim 2, wherein when the second frequency is selected as the capacity-change frequency, the switching the operating frequency of the compressor to the second frequency, and the changing the capacity of the compressor while maintaining the operating frequency of the compressor at the second frequency comprises:
    switching the operating frequency of the compressor to the second frequency; maintaining the operating frequency at the second frequency while determining whether the system pressure is stable; if yes, changing the capacity of the compressor.

5. The method of claim 1, wherein when the capacity is to be changed to increase, the changing the capacity of the compressor comprises:
    switching the operating frequency of the compressor from the first frequency to the capacity-change frequency, the switching being completed within a preset period of time from a time the switching starts;

changing the capacity of the compressor while maintaining the operating frequency of the compressor at the capacity-change frequency.

6. The method of claim 5 further comprising:
after the changing the capacity of the compressor, and when the capacity-change frequency is not equal to the second frequency, switching the operating frequency of the compressor from the capacity-change frequency to the second frequency.

7. The method of claim 3, wherein the determining whether the system pressure is stable comprises:
acquiring a first amount of change and a second amount of change, and determining whether the first amount of change is less than a preset first threshold and whether the second amount of change is less than a preset second threshold;
if yes, determining that the system pressure is stable,
wherein the first amount of change is an amount of change of a high-side pressure of the compressor during a first preset period of time, and the second amount of change is an amount of change of a low-side pressure of the compressor during a second preset period of time.

8. The method of claim 1, wherein the selecting the frequency smaller than the first frequency as the capacity-change frequency comprises:
setting the first frequency multiplied by a coefficient of proportionality as the capacity-change frequency,
wherein the coefficient of proportionality is a ratio of the capacity of the compressor before the changing the capacity to the capacity of the compressor after the changing the capacity.

9. The method of claim 4, wherein the determining whether the system pressure is stable comprises:
acquiring a first amount of change and a second amount of change, and determining whether the first amount of change is less than a preset first threshold and whether the second amount of change is less than a preset second threshold;
if yes, determining that the system pressure is stable,
wherein the first amount of change is an amount of change of a high-side pressure of the compressor during a first preset period of time, and the second amount of change is an amount of change of a low-side pressure of the compressor during a second preset period of time.

10. The method of claim 1, wherein the capacity is to be changed to decrease comprises:
changing the compressor from operating with two cylinders to operating with a single cylinder;
changing the compressor from operating with three cylinders to operating with two cylinders;
changing the compressor from operating with four cylinders to operating with three cylinders; or
changing the compressor from operating with five cylinders to operating with two cylinders.

11. The method of claim 1, wherein the capacity is to be changed to increase comprises:
changing the compressor from operating with a single cylinder to operating with two cylinders;
changing the compressor from operating with two cylinders to operating with three cylinders;
changing the compressor from operating with three cylinders to operating with four cylinders; or
changing the compressor from operating with two cylinders to operating with five cylinders.

12. A device for controlling a capacity change of a compressor, the device comprising:
a determination unit configured to determine whether a capacity of the compressor is required to be changed, and if yes, to determine a capacity-change frequency;
a capacity changing unit configured to change the capacity of the compressor while an operating frequency of the compressor is at the capacity-change frequency; and
wherein the determination unit is configured for:
determining whether the capacity of the compressor is required to be changed to increase or decrease;
when the capacity is to be changed to decrease, selecting a smaller one from a first frequency, before a frequency change, of the compressor, and a second frequency, after the frequency change, of the compressor, as the capacity-change frequency; and
when the capacity is to be changed to increase, selecting a frequency smaller than the first frequency as the capacity-change frequency.

13. The device of claim 12, wherein when the capacity is to be changed to decrease, the capacity changing unit is configured for:
when the first frequency is selected as the capacity-change frequency, changing the capacity of the compressor while maintaining the operating frequency of the compressor at the first frequency; and
when the second frequency is selected as the capacity-change frequency, switching the operating frequency of the compressor to the second frequency, and changing the capacity of the compressor while maintaining the operating frequency at the second frequency.

14. The device of claim 12, wherein when the capacity is to be changed to increase, the capacity changing unit is specifically configured for:
switching the operating frequency of the compressor from the first frequency to the capacity-change frequency, the switching being completed within a preset period of time from a time the switching starts;
changing the capacity of the compressor while maintaining the operating frequency of the compressor at the capacity-change frequency.

15. A smart home appliance comprising:
a compressor;
a processor; and
a memory storing instructions that are executable by the processor;
wherein by executing the instructions, the processor is configured for:
determining whether a capacity of the compressor is required to be changed; if yes, determining a capacity-change frequency;
changing the capacity of the compressor while an operating frequency of the compressor is at the capacity-change frequency;
wherein the determining the capacity-change frequency comprises:
determining whether the capacity of the compressor is required to be changed to increase or decrease;
when the capacity is to be changed to decrease, selecting a smaller one from a first frequency, before a frequency change, of the compressor, and a second frequency, after the frequency change, of the compressor, as the capacity-change frequency; and
when the capacity is to be changed to increase, selecting a frequency smaller than the first frequency as the capacity-change frequency.

* * * * *